United States Patent Office 2,867,003
Patented Jan. 6, 1959

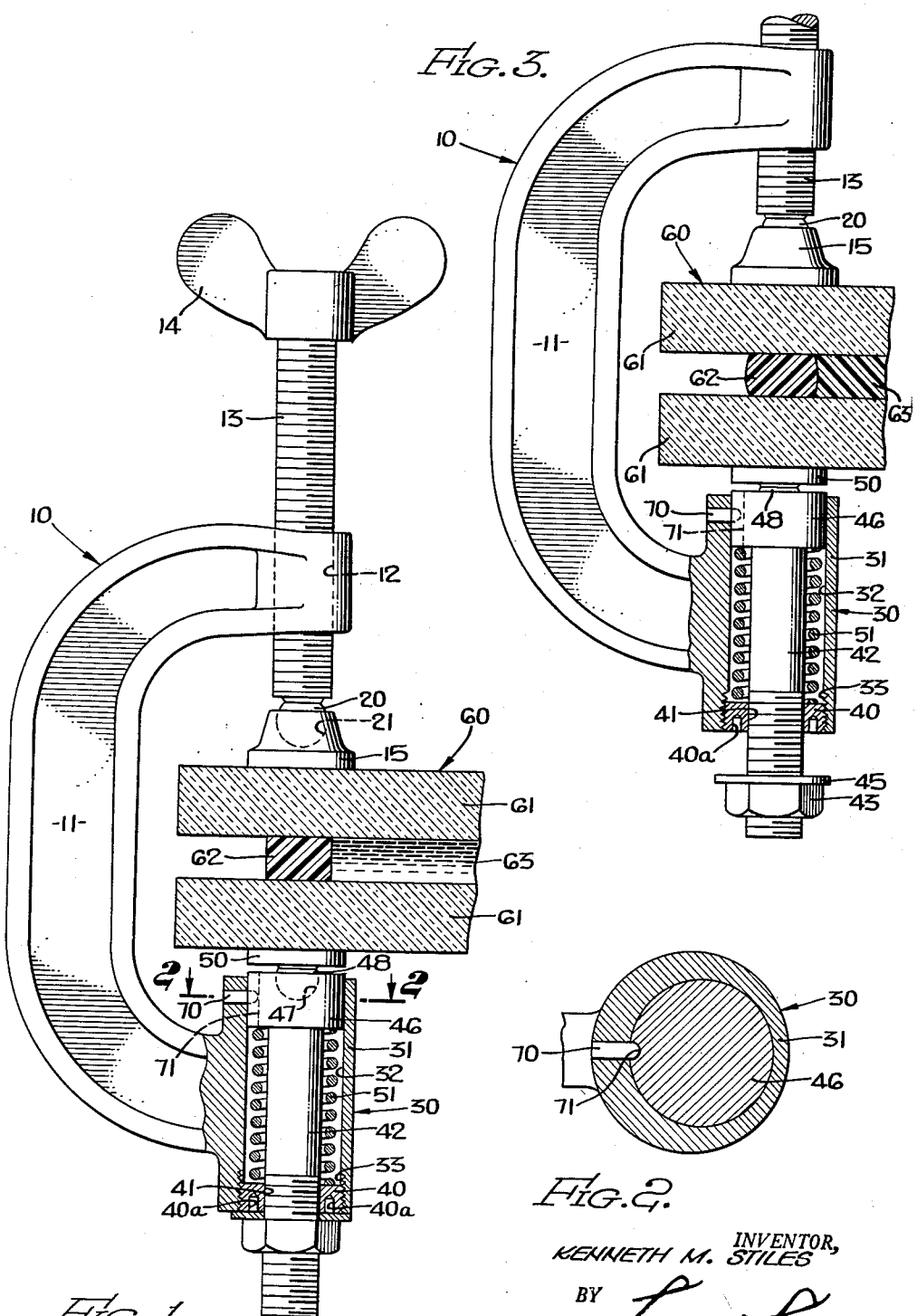

2,867,003
APPARATUS FOR CASTING PLASTIC SHEETS

Kenneth M. Stiles, Van Nuys, Calif., assignor to The Sierracin Corporation, Burbank, Calif., a corporation of California Application February 13, 1956, Serial No. 565,207

8 Claims. (Cl. 18—39)

This invention relates to the art of casting plastic in sheet form, and has particular reference to a clamping device for sheet-forming molds.

One of the principal objects of this invention is to provide a novel clamping device for use in connection with the casting of resinous plastics in sheet form.

The manufacture of cast transparent polyester sheet for use in aircraft glazing applications requires the use of a mold comprising a pair of high quality tempered glass sheets spaced apart by means of a peripheral grommet of rubber or extruded vinyl plastic. The grommet extends completely around the periphery of the glass approximately one inch from the edges thereof and, in accordance with conventional practice, C clamps are spaced about 10 inches apart to hold the assembly together and to provide for necessary adjustments. The grommet is from 10 to 25 percent thicker than the thickness of the sheet to be cast, to allow for shrinkage of the cast plastic and to make accurate gauging possible. The mold or cell thus formed is poured full of the liquid plastic, usually in catalyzed monomeric form, by removing a section of the grommet to provide an opening, after which it is sealed and the clamps replaced. The catalyzed plastic then begins its polymerization process which turns it from a liquid into a solid sheet. This is an exothermic reaction and the plastic undergoes shrinkage. In order to avoid pulling away of the plastic from the glass, the C clamps must be periodically tightened by hand, but great care must be taken not to tighten the clamps until the plastic has become firmly jelled to avoid thinning of the thickness adjacent the edges and the resulting unevenness in gauge of the finished plastic sheet. After the plastic has undergone the exothermic reaction and has started to cool, the mold is placed in an oven to complete the cure. During the curing process, further shrinkage takes place, necessitating the constant checking and tightening of the C clamps.

This required manual adjustment of the C clamps has been a constant source of trouble in the production of high quality plastic sheets. If the clamps are not adjusted at the proper time, the plastic pulls away from the glass plates of the mold, leaving an optical distortion which results in the rejection of that portion of the sheet. If the clamps are pulled too tight, breakage of the glass molding plates may occur, with loss of valuable equipment and material and great hazard to the safety of plant personnel. It is extremely difficult to adjust the numerous clamps so that uniform pressure is applied and hence it is difficult, if not impossible, to obtain exact uniformity in thickness of the as-cast sheet. Moreover, the clamp tightening operation is a tedious one, requiring great numbers of man-hours, not to mention the physical discomfort of the clamp-adjusting personnel who must enter and work in hot ovens in carrying out their duties.

Another object of this invention is, therefore, to provide a novel automatic clamp which overcomes the above and other disadvantages of the devices heretofore used.

Another object of this invention is to provide a novel automatic clamping device for casting molds, which is simple in construction and adapted to be manufactured economically on a quantity basis, yet which is highly effective in operation.

Other objects and advantages of this invention, it is believed, will be readily apparent from the following detailed description of a preferred embodiment thereof when read in connection with the accompanying drawings.

In the drawings:

Figure 1 is a side elevation, partly in section, illustrating the clamp device of this invention in position on a mold during the exothermic reaction phase of the casting operation.

Figure 2 is a sectional elevation taken substantially on the line 2—2 of Figure 1.

Figure 3 is a fragmentary view similar to Figure 1, but illustrating the clamp in the position required after gellation of the plastic has taken place.

Referring now to the drawings, the clamp member of this invention is generally indicated 10. It will be noted that it is generally similar to a conventional C clamp in that it is provided with a C-shaped body portion 11 having a threaded opening 12 in the upper leg of the body portion, in which opening is engaged the conventional lead screw 13 provided at the top thereof with a wing nut or handle 14 and at the bottom thereof with a foot member or clamp element 15. The foot member 15 is conventionally secured to the screw 13 by means of a ball 20 on the screw, a spherical socket 21 being provided in the foot member for reception of the ball to provide a ball and socket joint.

The present invention differs from the conventional C clamps, however, in that the usual fixed lower foot of the C clamp is replaced by the resiliently operable foot member assembly generally indicated 30. This assembly includes a cylindrical housing 31 integral with the lower leg of the body portion 11, the housing having a central longitudinal bore 32 extending therethrough and provided with threads 33 at the lower end thereof. Threadedly engaged therein is an externally-threaded adjustment nut 40 having a central bore 41 and a pair of opposed tool-receiving recesses 40a in the lower end thereof.

Extending through the bores 32 and 41 is a bolt member 42 threaded at the lower end thereof and carrying thereat a nut 43, the nut 43 being spaced from the lower end of the housing and the nut 40 by means of a washer 45. A cylindrical member 46 is integral with the upper end of the bolt member 42 and is provided with a spherical socket 47 for the reception of a ball 48 secured to the bottom portion of the bottom foot member 50. A helical spring 51 is interposed between the nut 40 and the cylindrical member 46 to resiliently urge the cylindrical member and its associated foot member 50 in a direction toward the foot member 15. A pin 70 extends from the inside of the housing 31 into a longitudinal slot 71 in the cylindrical member to prevent rotational motion of the cylindrical member and the bolt member 42, while permitting relative axial movement between the latter two and the housing.

In operation, the clamps 10 of this invention are used in place of the conventional C clamps used in conjunction with a mold such as that generally indicated 60 in the drawings herein. The mold 60 is generally rectangular, comprising two identical sheets 61 of tempered glass spaced apart by means of a peripheral grommet 62, preferably of vinyl plastic. The mold is filled with a catalyzed liquid plastic 63, such as a polyester, and a plurality of clamps 10 are applied as in Figure 1. It will be noted from an inspection of Figure 1 that the nut 43 is positioned so that the washer 45 is in contact with the bottom end of the cylindrical housing 31, thus locking the bolt 42 and the foot member 50 against longitudinal movement even though it is being urged upwardly by the compressed helical spring 51. With the device thus assembled, the clamp members 10 may be applied to the mold in the conventional manner as used with C clamps, with sufficient clamping pressure applied by adjustment of the lead screw 13 to gauge the spacing between the sheets 61 to the desired thickness.

Upon completion of the exothermic reaction to the point of setting of the plastic in the form of a firm jell, the nut 43 is turned to release it from engagement with the housing as shown in Figure 3. This permits the helical spring 51 to force the cylindrical member 46 and the foot member 48 in the direction of the upper foot member 15 to increase the pressure applied therebetween. As the plastic shrinks and decreases in thickness, this change in dimension is automatically compensated for by the spring 51, thus making unnecessary any further attention to the clamps after the nut 43 is once released. The strength of the spring must be great enough to overcome the resiliency of the grommet 62, and this spring strength may be adjusted by appropriate adjustment of the nut 40.

Castings made with the clamp of this invention have consistently shown a closer thickness tolerance, especially adjacent the edges of the sheet, and pull-away of the sheet from the mold sides has become a virtually non-existent problem. Of equal importance is the elimination of the problem of glass breakage and the great reduction in man-hours required for clamp adjustment.

Having fully described my invention, it is to be understood that I do not wish to be limited to the details set forth, but my invention is of the full scope of the appended claims.

I claim:

1. A clamp for use in casting plastics in sheet form, comprising the combination of a generally C-shaped body member having an upper leg and a lower leg, a lead screw operably connected to said upper leg for clamping adjustment relative thereto, an upper foot member operably connected to said lead screw, a lower foot member operably connected to said lower leg for clamping adjustment relative thereto, means for resiliently urging said lower foot member in the direction of said upper foot member, means for adjusting the resiliency of said urging means and means for releasably locking said lower foot member against movement in response to said resilient means.

2. A mold for casting plastics in sheet form, comprising the combination of a pair of glass plates; a resilient grommet interposed between said plates; and a plurality of clamp members positioned to maintain said plates and grommet in assembled relation, each of said clamp members comprising a generally C-shaped body member having an upper leg and a lower leg, a lead screw operably connected to said upper leg for clamping adjustment relative thereto, an upper foot member operably connected to said lead screw, a lower foot member operably connected to said lower leg for clamping adjustment relative thereto, means for resiliently urging said lower foot member in the direction of said upper foot member, means for adjusting the resiliency of said urging means, said urging means being of a strength sufficient to compress said grommet and means for releasably locking said lower foot member against movement in response to said resilient means.

3. A clamp for use in casting plastics in sheet form, comprising the combination of a generally C-shaped body member having an upper leg and a lower leg, a lead screw operably connected to said upper leg for clamping adjustment relative thereto, an upper foot member operably connected to said lead screw, a cylindrical housing integral with said lower leg and having a central bore coaxial with said lead screw, a bolt member slidable in said bore, a lower foot member carried by said bolt member, a compressed helical spring encompassing said bolt member and urging said lower foot member in the direction of said upper foot member, means for adjusting the tension of said spring and means for releasably locking said bolt and lower foot member against movement responsive to said helical spring.

4. A clamp for use in casting plastics in sheet form, comprising the combination of a generally C-shaped body member having an upper leg and a lower leg, a lead screw operably connected to said upper leg for clamping adjustment relative thereto, an upper foot member operably connected to said lead screw, a cylindrical housing integral with said lower leg and having a central bore coaxial with said lead screw, a bolt member slidable in said bore, a lower foot member carried by said bolt member, a compressed helical spring encompassing said bolt member and urging said lower foot member in the direction of said upper foot member, means for adjusting the tension of said spring and means for releasably locking said bolt and lower foot member against movement responsive to said helical spring, said means including a longitudinal slot in said bolt, a portion of said bolt depending below the lower end of said housing, said portion being threaded, a nut engaged with said threads, and a pin carried on said housing and engaging said bolt to prevent rotation of said bolt relative to said housing.

5. A mold for casting plastics in sheet form, comprising the combination of a pair of glass plates; a resilient grommet interposed between said plates; and a plurality of clamp members positioned to maintain said plates and grommet in assembled relation, each of said clamp members comprising a generally C-shaped body member having an upper leg and a lower leg, a lead screw operably connected to said upper leg for clamping adjustment relative thereto, an upper foot member operably connected to said lead screw, a cylindrical housing integral with said lower leg and having a central bore coaxial with said lead screw, a bolt member slidable in said bore, a lower foot member carried by said bolt member, a compressed helical spring encompassing said bolt member and urging said lower foot member in the direction of said upper foot member, means for adjusting the tension of said spring, the tension force of said spring being sufficient to compress said grommet and means for releasably locking said bolt and lower foot member against movement responsive to said helical spring.

6. A mold for casting plastics in sheet form, comprising the combination of a pair of glass plates; a resilient grommet interposed between said plates; and a plurality of clamp members positioned to maintain said plates and grommet in assembled relation, each of said clamp members comprising a generally C-shaped body member having an upper leg and a lower leg, a lead screw operably connected to said upper leg for clamping adjustment relative thereto, an upper foot member operably connected to said lead screw, a cylindrical housing integral with said lower leg and having a central bore coaxial with said lead screw, a bolt member slidable in said bore, a lower foot member carried by said bolt member, a compressed helical spring encompassing said bolt member and urging said lower foot member in the direction of said upper foot member, means for adjusting the tension of said spring, the tension force of said spring being sufficient to compress said grommet and means for releasably locking said bolt and lower foot member against movement responsive to said helical spring, said means including a longitudinal slot in said bolt, a portion of said bolt depending below the lower end of said housing, said portion being threaded, a nut engaged with said threads, and a pin carried on said housing and engaging said bolt to prevent rotation of and bolt relative to said housing.

7. A clamp for use in casting plastics in sheet form, comprising the combination of a body member having an upper leg and a lower leg, an upper foot member connected to said upper leg, a lower foot member connected to said lower leg, lead screw means operably connected to one of said legs and to one of said foot members for relative cramping adjustment between said foot members, means for resiliently urging one of said foot members in the direction of the other of said foot members, means for adjusting the resiliency of said urging means and means for releasably locking said resiliently urged foot member against movement in response to said locking means.

8. A mold for casting plastics in sheet form, comprising the combination of a pair of glass plates; a resilient grommet interposed between said plates; and a plurality of clamp members positioned to maintain said plates and grommet in assembled relation, each of said clamp members comprising a body member having an upper leg and a lower leg, an upper foot member connected to said upper leg, a lower foot member connected to said lower leg, lead screw means operably connected to one of said legs and to one of said foot members for relative clamping adjustment between said foot members, means for resiliently urging one of said foot members in the direction of the other of said foot members, means for adjusting the resiliency of said urging means, said urging means being of a strength sufficient to compress said grommet and means for releasably locking said resiliently urged foot member against movement in response to said locking means.

References Cited in the file of this patent

UNITED STATES PATENTS

| | | |
|---|---|---|
| 1,233,223 | Hachmann | July 10, 1917 |
| 1,391,828 | Hachmann | Sept. 27, 1921 |
| 1,768,345 | Thomas et al. | June 24, 1930 |
| 2,668,328 | Porter | Feb. 9, 1954 |
| 2,687,555 | Aspon et al. | Aug. 31, 1954 |
| 2,704,265 | Lyon | Mar. 15, 1955 |

FOREIGN PATENTS

| | | |
|---|---|---|
| 939,646 | France | Apr. 26, 1948 |
| 824,677 | Germany | Dec. 13, 1951 |